United States Patent
Patil et al.

(10) Patent No.: US 10,915,558 B2
(45) Date of Patent: Feb. 9, 2021

(54) ANOMALY CLASSIFIER

(71) Applicant: General Electric Company, Schenectady, NY (US)

(72) Inventors: Sundeep R Patil, Garching b. Munchen (DE); Ansh Kapil, Munich (DE); Oliver Baptista, Garching (DE)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 15/415,288

(22) Filed: Jan. 25, 2017

(65) Prior Publication Data
US 2018/0210942 A1    Jul. 26, 2018

(51) Int. Cl.
  G06F 7/00      (2006.01)
  G06F 16/28     (2019.01)
  G06F 16/2458   (2019.01)

(52) U.S. Cl.
  CPC ........ *G06F 16/285* (2019.01); *G06F 16/2477* (2019.01)

(58) Field of Classification Search
  CPC .......... G06F 17/30598; G06F 11/3452; G06F 11/0751; G06F 16/285; G06F 16/2477; G06F 11/0706
  USPC .......................... 707/736, 737, 740, 999.003
  See application file for complete search history.

(56) References Cited

U.S. PATENT DOCUMENTS

| 7,027,953 | B2 | 4/2006 | Klein | |
| 7,853,433 | B2 | 12/2010 | He et al. | |
| 2008/0319951 | A1* | 12/2008 | Ueno | G06F 17/30598 |
| 2010/0027432 | A1* | 2/2010 | Gopalan | H04L 41/142 370/252 |
| 2014/0298098 | A1* | 10/2014 | Poghosyan | G06F 11/3452 714/37 |
| 2015/0168229 | A1 | 6/2015 | Desilva | |
| 2016/0299938 | A1* | 10/2016 | Malhotra | G06F 17/30324 |

OTHER PUBLICATIONS

Tse et al., "Machine Fault Diagnosis Through an Effective Exact Wavelet Analysis", Journal of Sound and Vibration, vol. 277, Issues 4-5, pp. 1005-1024, Nov. 5, 2004, 20 pp.

Rajagopalan et al., "Symbolic Time Series Analysis via Wavelet-based Partitioning", Signal Processing, vol. 86, Issue 11, pp. 3309-3320, 2006, 12 pp.

Sugumaran et al., "Feature Selection using Decision Tree and Cassification through Proximal Support Vector Machine for Fault Diagnostics of Roller Bearing", Mechanical Systems and Signal Processing, vol. 21, Issue 2, pp. 930-942, Feb. 2007, 13 pp.

(Continued)

*Primary Examiner* — Md I Uddin
(74) *Attorney, Agent, or Firm* — Buckley, Maschoff & Talwalkar LLC

(57) ABSTRACT

According to some embodiments, a system and method are provided to classify an anomaly. The method comprises receiving, from an anomaly detection system, time-series data that comprises one or more anomalies. The time-series data is grouped into a plurality of groups based on a scale range. For each group of the plurality of groups, statistical features are extracted from the time-series data. The extracted statistical features associated with the plurality of groups are combined and the one or more anomalies are classified based on the combined extracted statistical features.

19 Claims, 5 Drawing Sheets

(56) References Cited

OTHER PUBLICATIONS

Sun et al., "Decision Tee and PCA-based Fault Diagnosis of Rotating Machinery", Mechanical Systems and Signal Processing, vol. 21, Issue 3, pp. 1300-1317, Apr. 2007, 18 pp.

Sarkar et al., "Fault Diagnosis and Isolation in Aircraft Gas Turbine Engines", IIEEE, In American Control Conference, pp. 2166-2171, 2008, 6 pp.

Sarkar et al., Estimation of multiple faults in aircraft gas-turbine engines. IEEE in American Control Conference, pp. 216-221, Jun. 2009, 6 pp.

Jin et al., "Wavelet-based Feature Extraction using Probabilistic Finite State Automata for Pattern Classification", Pattern Recognition, vol. 44, pp. 1343-1356, 2011, 14 pp.

Jin et al., Anomaly Detection in Nuclear Power Pants via Symbolic Dynamic Filtering. Nuclear Science, IEEE Transactions on, vol. 58, Issue 1, pp. 277-288, 2011, 14 pp.

Jiang et al., "Machine Condition Classification Using Deterioration Feature Extraction and Anomaly Determination", IEEE Transactions on Reliability, vol. 60, Issue 1, pp. 41-48, 28 Jan. 2011, 8 pp.

Written, "Data Mining: Practical Machine Learning Tools and Techniques", Third Edition (Morgan Kaufmann Series in Data Management Systems, http://www.sciencedirect.com/science/book/9780123748560, 2011, 665 pp.

Wu et al., "Fault Analysis of Engine Timing Gear and Valve Clearance Using Discrete Wavelet and a Support Vector Machine", International Journal of Computer Theory and Engineering, vol. 4, Issue 3, pp. 386-390, Jun. 2012, 5 pp.

Das et al., "Anomaly detection in flight recorder data: A dynamic data-driven approach", IEEE in American Control Conference (ACC), pp. 2668-2673, 2013, 6 pp.

Reif et al., "Anomaly Detection by Combining Decision Trees and Parametric Densities", German Research Center for Artificial Intelligence, 2008, pp. 1-4, 4 pp.

\* cited by examiner

ANOMALY CLASSIFIER

BACKGROUND

Maintenance of various machines such as, but not limited to, engines, turbines, rail vehicles and aircraft, is essential for the longevity of the machines. Early detection and diagnosis of problems, or potential problems, associated with the machines may help avoid loss of use of the machines as well as prevent secondary damage. For example, various components of a machine may breakdown over time and failure to diagnose and repair these breakdowns may lead to loss of use of the machine or, in some cases, the breakdowns may cause damage to other components of the machine thus causing secondary damage. It would therefore be desirable to provide a system to classify problems or potential problems associated with a machine as early as possible to provide time for a repair crew to address the determined or potential problems associated with the machine.

SUMMARY

Some embodiments described herein relate to a system and method to classify an anomaly associated with time-series data. The method comprises receiving, from an anomaly detection system, time-series data that comprises one or more anomalies. The time-series data may be grouped into a plurality of groups based on a scale range. For each group of the plurality of groups, statistical features may be extracted from the time-series data. The extracted statistical features associated with the plurality of groups may be combined and the one or more anomalies may be classified based on the combined extracted statistical features.

A technical advantage of some embodiments disclosed herein are improved systems and methods for early classification and diagnosis of problems or potential problems associated with machines.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments described herein relate to a novel system and method to classify known anomalies/faults associated with time-series data that is transmitted from one or more sensors that monitor a machine (e.g., an engine). In some embodiments, a user may be alerted to a classified anomaly/fault associated with the machine.

Figure 1:
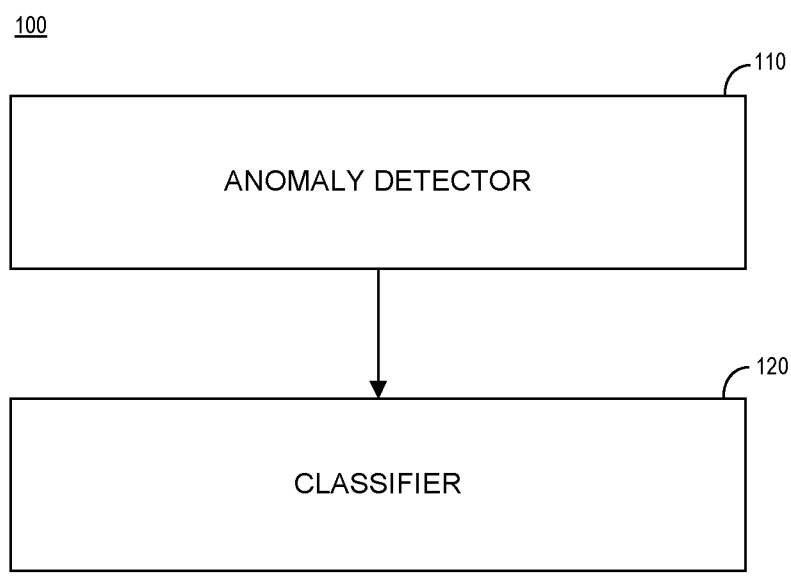
FIG. 1 is an overview of a system in accordance with some embodiments.

Now referring to FIG. 1, an embodiment of a system 100 is illustrated. As illustrated in FIG. 1, the system 100 comprises an anomaly detector 110 and a classifier 120. The detector 110 may comprise any classifier that is capable of detecting deviations in time-series data.

The detector 110 may receive time-series data from a plurality of sensors associated with a machine. For example, in one embodiment, the detector 110 may receive time-series data from sensors that monitor each cylinder associated with an engine. The detector 110 may receive multiple streams of data (e.g., one stream for each cylinder) and the detector 110 may compare the time-series data to an existing model to indicate the presence of an anomaly associated with the received time-series data. Furthermore, the detector 110 may output time-series data that may be determined to be anomalous. In some embodiments, the detector 110 may also provide a closeness indicator associated with the time-series data. For example, in a case that the time-series data is associated with an engine, the engine may comprise six cylinders and six different time-series data streams (e.g., one per cylinder) may be received at the detector 110. In this embodiment, the detector 110 may determine (1) if the time-series data associated with a cylinder comprises anomalous data and (2) for time-series data that is determined to be anomalous, the detector may also provide a closeness indicator that specifies how close or far away the anomalous time-series data is from time-series data that was determined to be normal. For example, if time-series data associated with cylinder number 3 is determined to be anomalous, the detector 110 may compare the time-series data associated with cylinder number 3 to the time-series data associated with the remaining five cylinders. The closeness indicator indicates how close the time-series data associated with cylinder number 3 is from the time-series data associated with the remaining five cylinders and the closeness indicator may be provided in terms of a percentage distance, or a high/medium/low indicator.

The classifier 120 may receive the anomalous time-series data from the anomaly detector 110 and process (e.g., classify) the anomalous time-series data to determine a known anomaly. The process of classifying the anomalous time-series data will now be described in more detail with respect to FIG. 2.

Figure 2:
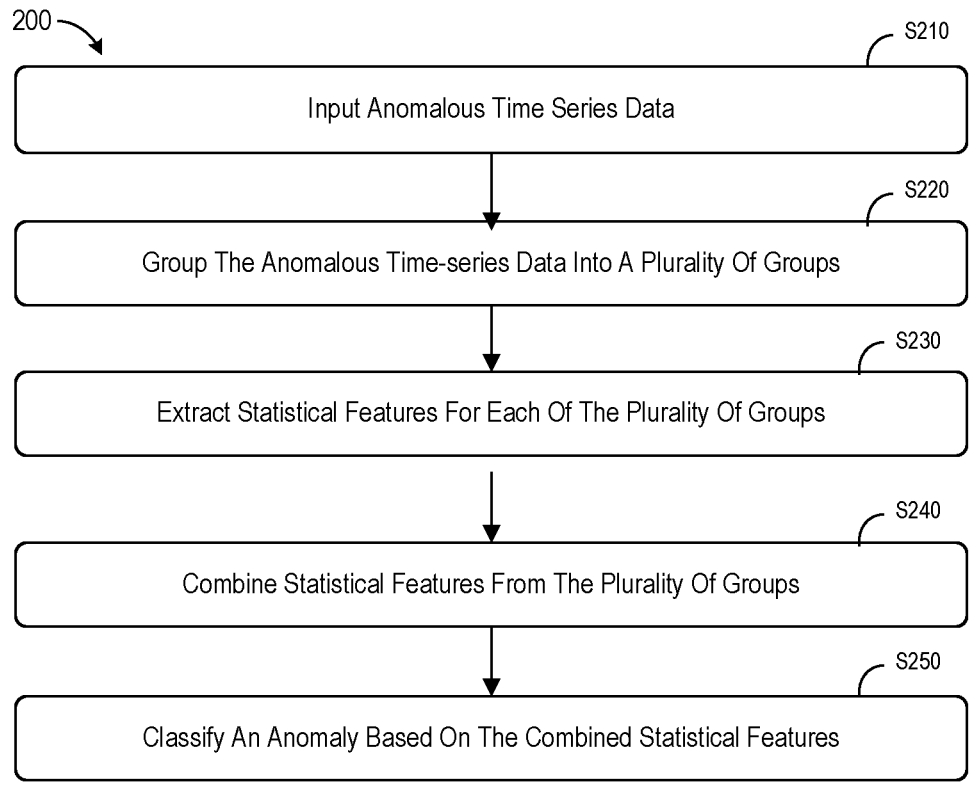
FIG. 2 illustrates a method in accordance with some embodiments.

FIG. 2 illustrates a method 200 that might be performed by the classifier 120 of the system 100 described with respect to FIG. 1. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

At S210, anomalous time-series data may be received from a detector. In some embodiments, the detector may transmit both the anomalous time-series data as well as a closeness indicator.

Figure 3:
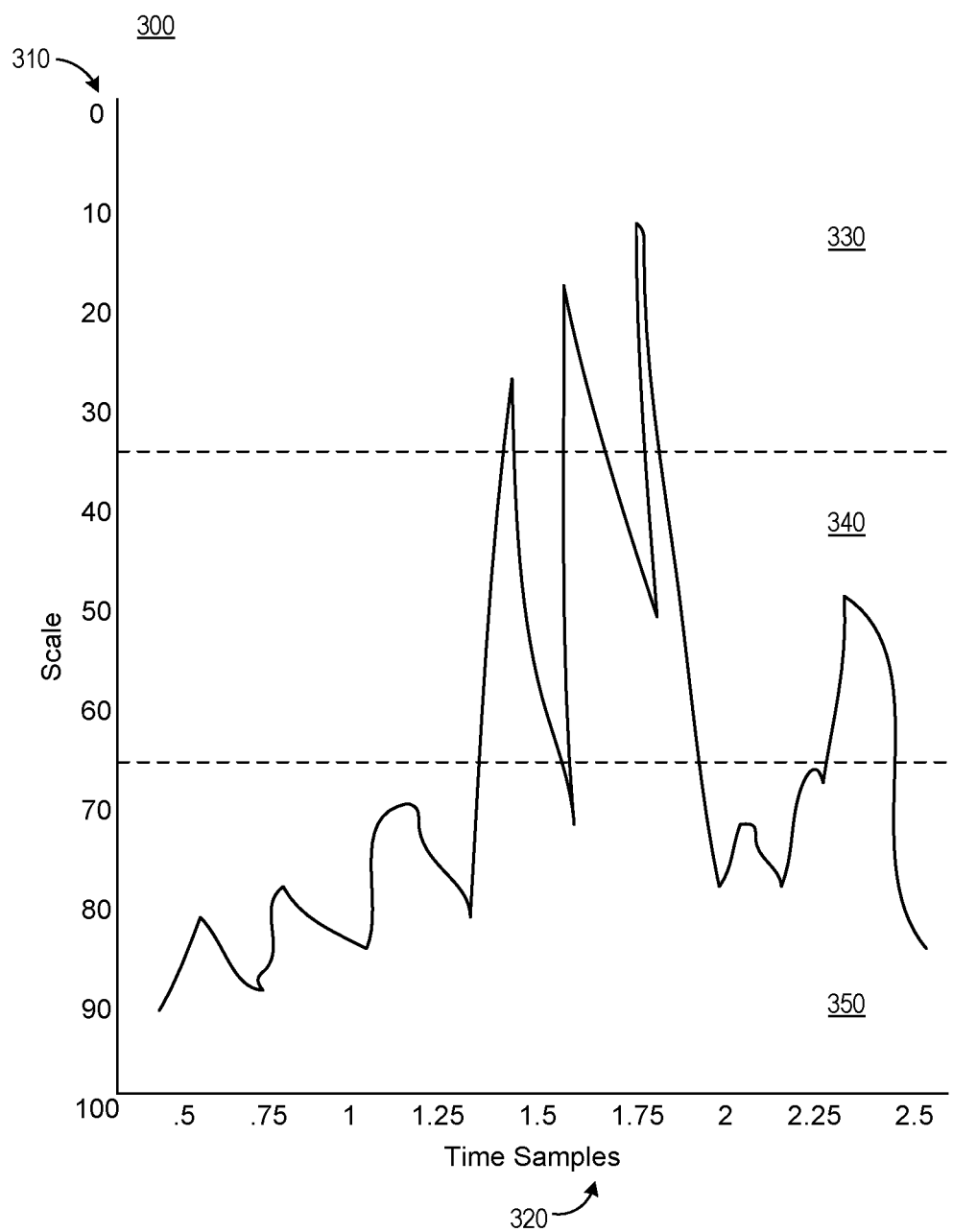
FIG. 3 illustrates a grouping of data based on scales according to some embodiments.

Next, at S220, the received time-series data may be divided into a plurality of groups based on a scale range. For example, and now referring to FIG. 3, a transform of an anomalous time-series of data is illustrated according to some embodiments. As illustrated in FIG. 3, the scale range may be divided into a high scale 330, a medium scale 340 and a low scale 350. According to some embodiments, the plurality of groups may comprise three or more scale ranges and each of the plurality of groups may comprise a time-series representation of the anomalous time-series data in their respective scale range. In the high scale 330, values and features in the scale range from 0-33 may be extracted. In the medium scale 340, values and features in the scale range from 34-66 may be extracted. In the low scale 350, values and features in the scale range from 67-100 may be extracted. In other words, each grouping which has a different scale range may provide different features and characteristics within their own scale range. In some embodiments, the plurality of groups may not be of equal size and may be application specific.

Furthermore, as illustrated in FIG. 3, the x-axis 320 defines sample numbers and the y-axis 310 indicates scales. In some embodiments, the classifier may transform the anomalous time-series data using wavelets. In this embodiment, the scales may comprise wavelet scales where a wavelet coefficient is generated for each sample. Wavelet scales may relate to brief oscillations associated with the received time-series data.

In one embodiment, FIG. 3 may relate to time-series data 300 associated with temperature characteristics of a cylinder (e.g., heat). In this embodiment, the data illustrated in FIG. 3 may comprise temperature intensity of an individual cylinder that is indicated as having anomalous time-series data. In other embodiments, FIG. 3 may relate to electrical resistance, power output, capacitance, or speed characteristics associated with a machine.

Grouping the data may be based on automatically dividing a range of data (e.g., x number of units) into usable sets of data. Usable sets may be based on a balance between processor time and an amount of data to process. In one example, a usable group range may comprise every 10 and 40 units within the range of data. In this example, groups having a range under 10 units may create too many groups such that a system's ability to process data may be slowed by having too many jobs to process. However, for groups of data having over 40 units there may be too much data that needs to be processed and thus some data may be lost. Thus, the plurality of groups may be based on determining a range that defines a number of the groups within the plurality of groups. In other embodiments, a user may input a number of groups to use.

Next at S230, for each group of the plurality of groups, statistical features are extracted from the time-series data. Extracting may be performed via a processor such as that described with respect to FIG. 4. The statistical features may comprise values, means, modes, standard deviations, or other statistical features.

Each range may be processed individually. For example, in a case where a system has divided the range into three groups, the system may first extract statistical features from the high group and save that information in a database or other storage device. Next, the system may extract statistical features from the medium group and save that information in the database or other storage device. Finally, the system may extract statistical features from the low group and save that information in a database or other storage device. In this way each group is treated as its own time-series data.

Next, the extracted statistical features associated with the plurality of groups are combined at S240. The combination of statistical features may be used to create a model of the anomaly associated with the time-series data. Since each group has a different scale range that provides different features and characteristics within their own scale range, combining extracted statistical features may form a more detailed model of the anomaly associated with the time-series data. Furthermore, in some embodiments combining features from the groups may reduce dimensions that are fed into a classifier, such as a decision tree classifier, without loss of information. By reducing dimensions, the statistical features may be simpler to classify and more accurately classified since information may not be lost.

In some embodiments, the extracted statistical features may be combined based on multiple learning algorithms or ensemble learning techniques such as, but not limited to, boosting, bagging, Bayesian parameter averaging (BPA), Bayesian model combination (BMC), Bucket of models, or stacking.

Next at S250, the one or more anomalies may be classified based on the combined extracted statistical features. Classifying may be based on a decision tree. For example, a decision tree may be used as a predictive model to map observations about an item to conclusions about the item.

In some embodiments, and prior to classifying an anomaly associated with the received time-series data, the classifier may examine a closeness indicator that was received from the anomaly detection system. The classifier may use the closeness indicator to confirm that the received time-series data comprising one or more anomalies is sufficiently far enough away from time-series data that is classified as normal. For example, if the closeness indicator that is provided indicate that the anomalous time-series is relatively close to normal data, a classification may not be performed since there is a likelihood that the received time-series data may be indicating a relatively small fluctuation and not an anomaly that needs addressing. However, should the closeness indicator that is provided indicate that the anomalous time-series is relatively far away from normal data, a classification may be performed since there is a likelihood that the received time-series data may be indicating an anomaly that needs addressing.

Figure 4:
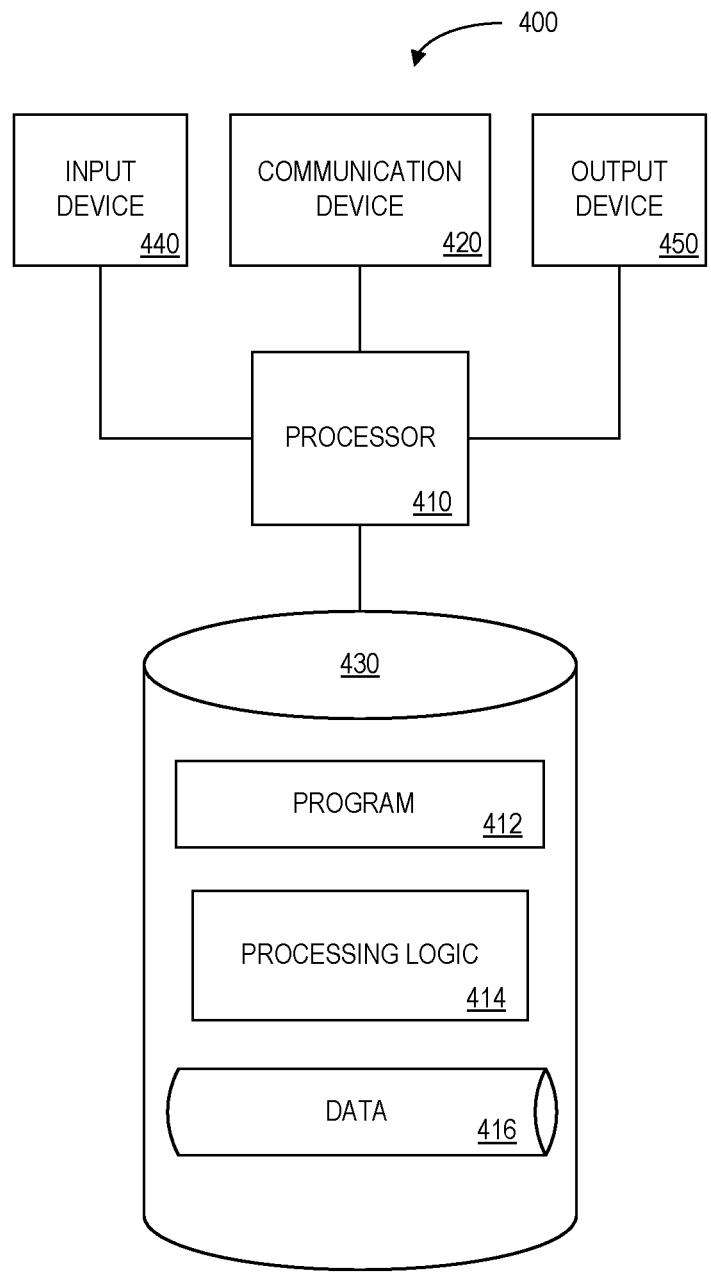
FIG. 4 illustrates a classifier system according to some embodiments.

Note the embodiments described herein may be implemented using any number of different hardware configurations. For example, FIG. 4 illustrates a processing platform 400 that may be, for example, associated with the system 100 of FIG. 1. The processing platform 400 may comprise a processor 410 ("processor"), such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more users. The processing platform 400 further includes an input device 440 (e.g., a mouse and/or keyboard to enter information about the measurements and/or assets) and an output device 450 (e.g., to output and display the data and/or recommendations).

The processor 410 also communicates with a memory/storage device 430 that stores data 414. The storage device 430 may comprise any appropriate information storage device, including combinations of magnetic storage devices (e.g., a hard disk drive), optical storage devices, mobile telephones, and/or semiconductor memory devices. The storage device 430 may store a program 412 and/or processing logic 414 for controlling the processor 410. The processor 410 performs instructions of the programs 412, 414, and thereby operates in accordance with any of the embodiments described herein. For example, the processor 410 may receive data from a machine and may create a model based on the data and/or may also detect anomalies via the instructions of the programs 412 and processing logic 414.

The programs 412, 414 may be stored in a compiled, compressed, uncompiled and/or encrypted format or a combination. The programs 412, 414 may furthermore include other program elements, such as an operating system, a database management system, and/or device drivers used by the processor 410 to interface with peripheral devices.

Figure 5:
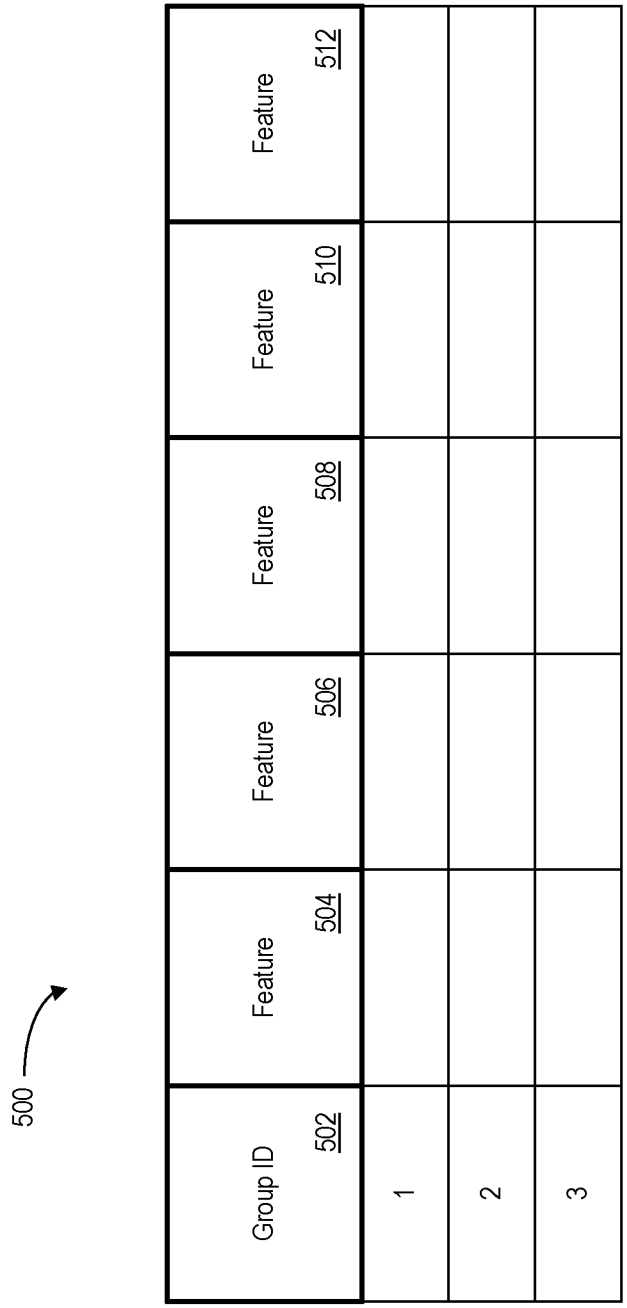
FIG. 5 illustrates a portion of a database according to some embodiments.

FIG. 5 is a tabular view of a portion of a database 500 in accordance with some embodiments of the present invention. The table includes entries associated with statistical feature data. The table also defines fields 502, 504, 506, 508, 510, and 512 for each of the entries. The fields specify: a group ID 502, a first statistical feature 504, a second statistical feature 506, a third statistical feature 508, a fourth statistical feature 510 and an nth statistical feature 512. The information in the database 500 may be periodically created and updated based on information collection during operation of machines as they are received from one or more sensors.

The group ID 502 might be a unique alphanumeric code identifying a specific group of a plurality of groups and the features 504/506/508/510/512 might provide information related to statistical features associated with a specific range.

As used herein, information may be "received" by or "transmitted" to, for example: (i) the platform 400 from another device; or (ii) a software application or module within the platform 400 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method of classifying an anomaly, the method comprising:
 receiving, from an anomaly detection system, one or more sets of time-series data as a data stream, each of the one or more sets of time-series data obtained from a respective sensor monitoring a machine, at least one of the one or more sets of time-series data comprising one or more anomalies;
 a classifier transforming the anomalous time-series data using wavelets and detecting deviations in the time-series data;
 grouping the time-series data into a plurality of groups including a time-series representation of the anomalous time-series data in their respective scale range, each range processed individually;
 for each group of the plurality of groups, extracting, via a processor, statistical features including the deviations from the time-series data of each range;
 creating a model for at least one of the one or more anomalies by combining extracted statistical features associated with the plurality of groups, the combining reducing dimensions provided to the classifier;

for each of the one or more anomalies, examining a respective closeness indicator, each respective closeness indicator specifying for a respective one of each of the one or more anomalies a respective temporal distance indicating how close or far away in time the respective anomaly is to a temporal location of normal data in at least one of the one or more sets of received time-series data;

based on the magnitude of each respective temporal distance, the classifier classifying each respective one of the one or more anomalies as one of normal data or not normal data based on the model of combined extracted statistical features; and alerting a user to the anomaly classification of at least one of the one or more anomalies associated with the machine.

2. The method of claim 1, wherein the scale range is related to brief oscillations associated with the received time-series data.

3. The method of claim 1, wherein the plurality of groups comprises three or more scale ranges.

4. The method of claim 3, wherein each of the plurality of groups is a time-series representation in their respective scale range.

5. The method of claim 1, further comprising:
receiving a closeness indicator from the anomaly detection system; and
confirming, based on the closeness indicator, that the received time-series data is sufficiently far enough away from time-series data indicated as being normal to indicate an anomaly.

6. The method of claim 1, wherein the plurality of groups is based on determining a scale range that defines a number of the groups in the plurality of groups.

7. A non-transitory computer-readable medium comprising instructions that when executed by a processor cause the processor to perform a method of classifying an anomaly, the method comprising:
a classifier transforming the anomalous time-series data using wavelets and detecting deviations in the time-series data;
grouping the time-series data into a plurality of groups including a time-series representation of the anomalous time-series data in their respective scale range, each range processed individually;
for each group of the plurality of groups, extracting, via a processor, statistical features including the deviations from the time-series data of each range;
creating a model for at least one of the one or more anomalies by combining extracted statistical features associated with the plurality of groups, the combining reducing dimensions provided to the classifier;
for each of the one or more anomalies, examining a respective closeness indicator, each respective closeness indicator specifying for a respective one of each of the one or more anomalies a respective temporal distance indicating how close or far away in time the respective anomaly is to a temporal location of normal data in at least one of the one or more sets of received time-series data;
based on the magnitude of each respective temporal distance, the classifier classifying each respective one of the one or more anomalies as one of normal data or not normal data based on the model of combined extracted statistical features; and
alerting a user to the anomaly classification of at least one of the one or more anomalies associated with the machine.

8. The medium of claim 7, wherein the scale range is related to brief oscillations associated with the received time-series data.

9. The medium of claim 7, wherein the plurality of groups comprises three or more scale ranges.

10. The medium of claim 9, wherein each of the plurality of groups is a time-series representation in their respective scale range.

11. The medium of claim 7, further comprising:
receiving a closeness indicator from the anomaly detection system; and
confirming, based on the closeness indicator, that the received time-series data is sufficiently far enough away from time-series data indicated as being normal to indicate an anomaly.

12. The method of claim 11, wherein the closeness indicator is provided in terms of a percentage distance from the time-series data indicated as being normal.

13. The medium of claim 7, wherein the plurality of groups is based on determining a scale range that defines a number of the groups in the plurality of groups.

14. A system for classifying an anomaly, the system comprising:
a processor; and
a non-transitory computer-readable medium comprising instructions that when executed by the processor cause the processor to perform a method to automatically detect anomalies, the method comprising:
monitoring a machine, at least one of the one or more sets of time-series data comprising one or more anomalies;
a classifier transforming the anomalous time-series data using wavelets and detecting deviations in the time-series data;
grouping the time-series data into a plurality of groups including a time-series representation of the anomalous time-series data in their respective scale range, each range processed individually;
for each group of the plurality of groups, extracting, via a processor, statistical features including the deviations from the time-series data of each range;
creating a model for at least one of the one or more anomalies by combining extracted statistical features associated with the plurality of groups, the combining reducing dimensions provided to the classifier;
for each of the one or more anomalies, examining a respective closeness indicator, each respective closeness indicator specifying for a respective one of each of the one or more anomalies a respective temporal distance indicating how close or far away in time the respective anomaly is to a temporal location of normal data in at least one of the one or more sets of received time-series data;
based on the magnitude of each respective temporal distance, the classifier classifying each respective one of the one or more anomalies as one of normal data or not normal data based on the model of combined extracted statistical features; and
alerting a user to the anomaly classification of at least one of the one or more anomalies associated with the machine.

15. The system of claim 14, wherein the scale range is related to brief oscillations associated with the received time-series data.

16. The system of claim 14, wherein the plurality of groups comprises three or more scale ranges.

17. The system of claim 16, wherein each of the plurality of groups is a time-series representation in their respective scale range.

18. The system of claim 14, further comprising:
receiving a closeness indicator from the anomaly detection system; and
confirming, based on the closeness indicator, that the received time-series data is sufficiently far enough away from time-series data indicated as being normal to indicate an anomaly.

19. The system of claim 14, wherein the plurality of groups is based on determining a scale range that defines a number of the groups in the plurality of groups.

* * * * *